United States Patent [19]
Denny et al.

[11] Patent Number: 5,289,654
[45] Date of Patent: Mar. 1, 1994

[54] ANIMATED WILDFOWL DECOY

[76] Inventors: Arthur Denny, P.O. Box 9, Franklin, N.Y. 13775; William Heaney, HC 64 Box 63A, Oneonta, N.Y. 13820

[21] Appl. No.: 4,853

[22] Filed: Jan. 19, 1993

[51] Int. Cl.$^5$ ............................................ A01M 31/06
[52] U.S. Cl. ................................................ 43/2; 43/3
[58] Field of Search .......................................... 43/2, 3

[56] References Cited

U.S. PATENT DOCUMENTS

| | | | |
|---|---|---|---|
| 2,799,960 | 7/1957 | Riley | 43/3 |
| 3,350,808 | 11/1967 | Mitchell | 43/3 |
| 3,689,927 | 9/1972 | Boston | 43/3 |
| 3,916,553 | 11/1975 | Lynch | 43/3 |
| 4,965,953 | 10/1990 | McKinney | 43/2 |
| 5,036,614 | 8/1991 | Jackson | 43/3 |
| 5,168,649 | 12/1992 | Wright | 43/2 |

FOREIGN PATENT DOCUMENTS 2338094  2/1975  Fed. Rep. of Germany ............ 43/2

Primary Examiner—Kurt C. Rowan
Attorney, Agent, or Firm—George R. McGuire

[57] ABSTRACT

An animated decoy simulating the external appearance and certain head and neck movements of a wild turkey. The decoy is essentially hollow, and the neck includes a plurality of interconnected, longitudinal segments. In a first embodiment, the head and neck are pivotally movable in an up and down manner with respect to the body, and the head is movable in a twisting motion with respect to the neck. First and second motors, independently actuable by an RF transmitter, with appropriate motion transfer linkages, effect movement of the decoy parts. In a second embodiment, a motor is actuable in response to audible sounds, such as live or simulated turkey call, to effect pivotal up and down movement of the decoy head and neck

19 Claims, 4 Drawing Sheets

ANIMATED WILDFOWL DECOY

BACKGROUND OF THE INVENTION

The present invention relates to decoys for attracting predetermined species of birds, and more particularly to decoys with movable parts actuable to simulate life-like movements of turkeys, or the like.

Decoys having an external appearance simulating a particular type or species of bird have long been used as a means of attracting such birds. Many types of such decoys are directed to water fowl, and include means for propelling a floating decoy over the water and/or for effecting movement of the wings, head, or other components of the decoy. Examples of such water fowl decoys are found in U.S. Pat. Nos. 109,998 of Hart, 378,410 of Trimble, 2,835,064 of Webb, 3,768,192 of Caccamo, 4,322,908 of McCrory, 4,845,873 of Hazlett and 3,689,927 of Boston, the latter including remote, radio-controlled means for effecting movement of the decoy.

Other, land-based decoys have been provided with means for effecting movement of the entire decoy or head and neck portions thereof to simulate life-like movements of live birds. Such decoys are typified by those disclosed in U.S. Pat. Nos. 2,576,209 of Berger, 3,916,553 of Lynch et al, 4,965,953 of McKinney and 5,036,614 of Jackson.

It is an object of the present invention to provide a novel animated bird decoy with improved structure and operation for simulating live bird movements.

Another object is to provide a life-like wild turkey decoy with means for effecting multiple head and neck movements realistically simulating a live bird.

A further object is to provide a wildfowl decoy having movable head and neck portions which are actuated in response to actual bird calls or other audible sounds.

Still another object is to provide an animated bird decoy having both electrical and mechanical components which operates very quietly, and is intermittently actuated.

Other objects will in part be obvious and will in part appear hereinafter.

SUMMARY OF THE INVENTION

In accordance with the foregoing objects, the invention is embodied in a decoy having hollow body, neck and head portions which may be conveniently and economically molded in the form of a simulated bird, such as the disclosed wild turkey. The neck portion is cut to provide a plurality of interconnected longitudinal segments, thereby improving the appearance of neck flexibility when the neck and head are moved in an up and down direction to simulate a pecking motion. Mechanical and electrical components are mounted within hollow portions of the decoy.

In one embodiment, a first servo motor is mounted within the body and connected by an appropriate linkage to the neck to effect reciprocating, up and down movement of the head in response to actuation of the first motor. A second motor is mounted in the neck and connected to fixed structure in the head to effect reciprocating, twisting movement of the head relative to the neck in response to actuation of the second motor. Actuation of the two motors is controlled from a remote location by means of a hand-held, multi-frequency RF transmitter and a receiver mounted within the body.

In a second disclosed embodiment, movement of the head and neck is actuated by audible sounds, including actual or simulated turkey calls, received by a microphone mounted in the decoy body. Circuitry interposed between the microphone and servo motor includes a high gain amplifier circuit, a timing network to extend the pulse width of the signal generated by high frequency, short duration turkey calls, a transistor switch and an oscillating circuit. The distance of travel of the movable portions is a function of pulse width. In both embodiments, batteries are mounted in the hollow body portion to provide a DC power source for the motor.

DETAILED DESCRIPTION OF THE PREFERRED EMBODIMENT

Figure 1:
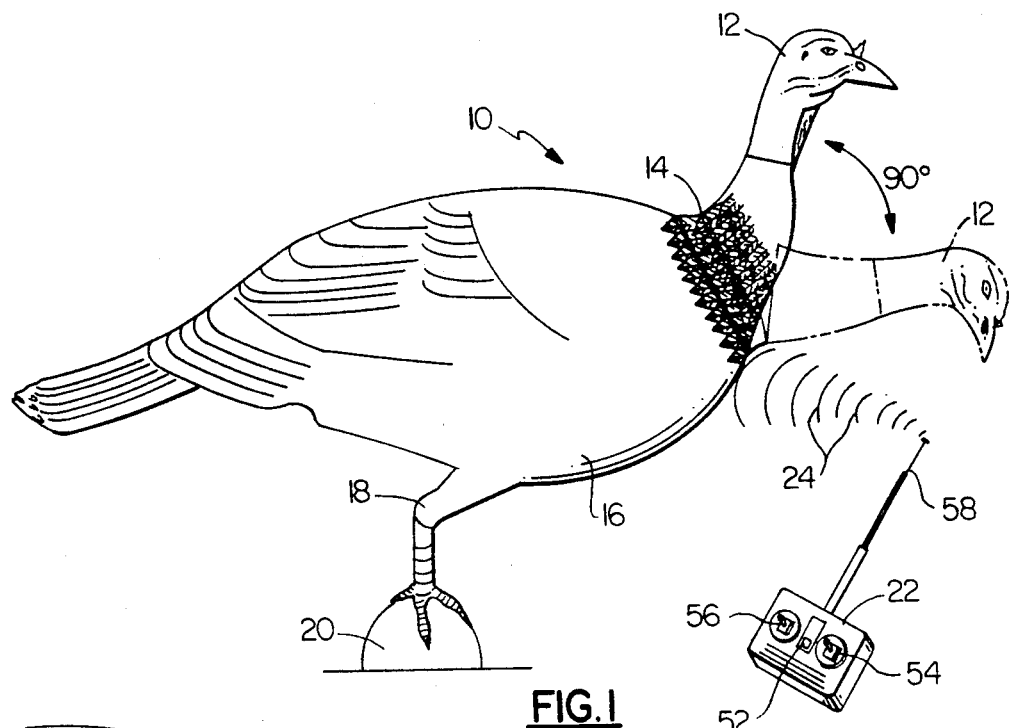
FIG. 1 is a side elevational view of a turkey decoy showing the head and neck in first and second terminal positions relative to the body.
Figure 2:
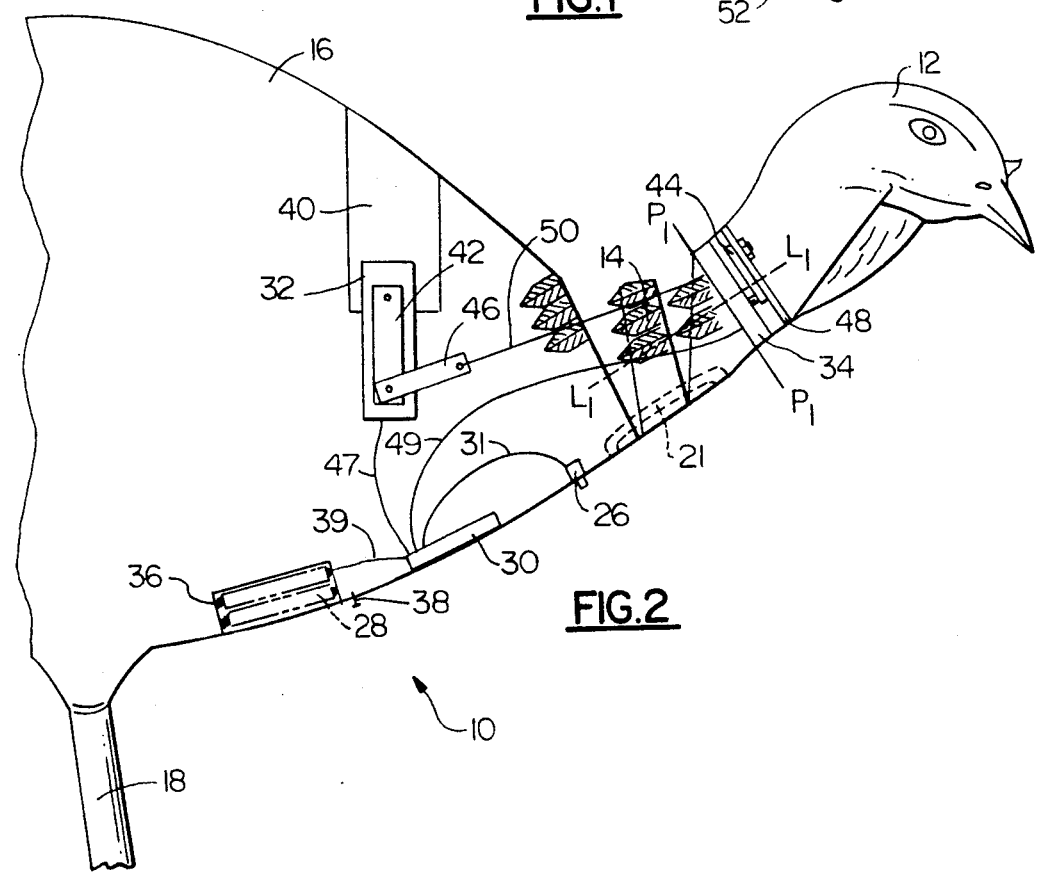
FIG. 2 is a fragmentary side elevational view of the turkey decoy of FIG. 1, showing in particular, the internal motion control elements of the turkey decoy.

Referring now to the drawing figures, there is seen in FIG. 1 a remotely operated, animated turkey decoy, generally denoted by reference numeral 10, whose actions and external appearance resemble that of a real turkey. Turkey decoy 10 is seen to externally include a turkey head 12, segmented neck 14, body 16, legs 18, and stand 20. It is important to note that all body elements of turkey decoy 10 may be molded of latex, plastic, or other suitable flexible materials, and are all hollow, thus defining cavities inside each body element. After the full decoy is molded, the neck portion is cut partially through to provide a plurality of longitudinal segments. Head 12 is completely detached from turkey decoy 10 and is reattached to neck 14 by a strap 21. Turkey decoy 10 may be deemed to include a plane $P_1$, which extends through the portion of turkey decoy 10 where neck 14 and head 12 are connected to one another. Turkey decoy 10 may further be deemed to include an axis $L_1$ extending centrally through and normal to plane $P_1$.

Figure 3:
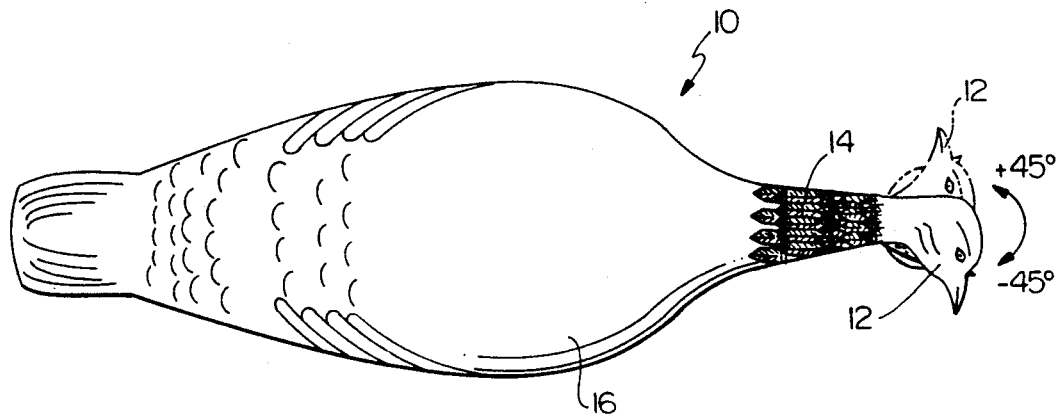
FIG. 3 is a top plan view of the turkey decoy of FIG. 1, showing the head in terminal positions of movement relative to the neck.

Turkey decoy 10 is capable of pivotally moving its head 12 in an up and down manner, as best illustrated in FIG. 1, and also in a twisting side to side motion as illustrated in FIG. 3. When turkey decoy 10 is in its terminal up position, as shown by the solid lines in FIG. 1, it simulates a real turkey having an alert posture, while in its terminal down position, as shown by phantom lines in FIG. 1, it simulates a real turkey feeding, and while reciprocating between the two positions, it simulates the pecking motion of a real turkey. Turkey decoy 10 is capable of approximately 90 degrees of motion of neck 14 between its terminal up and down positions. As previously mentioned, head 12 of turkey decoy 10 is capable of twisting side to side, thus simulating a real turkey looking to its sides. Head 12 is capable of twisting approximately 45 degrees to each the left and right about axis $L_1$.

Figures 4, 5, 6:
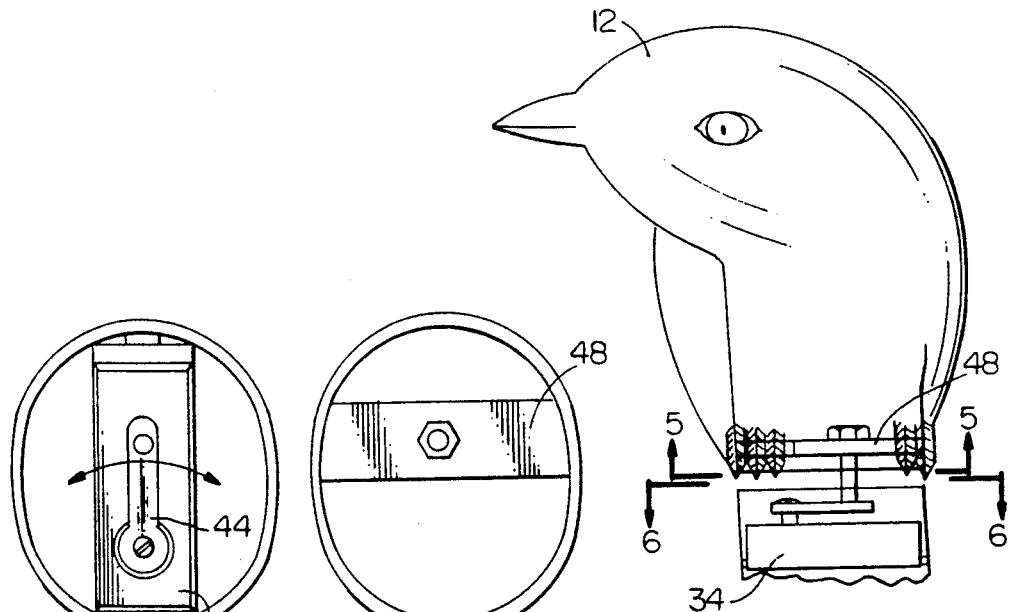
FIG. 4 is a side elevational view of the head of the turkey decoy of FIG. 1, showing in particular, the motion control elements positioned therein.
FIG. 5 is a cross sectional view taken along line 5—5 of FIG. 4.
FIG. 6 is a cross sectional view taken along line 6—6 of FIG. 4.

Movement of turkey decoy 10 is achieved through communication between the internal, control elements of turkey decoy 10 and a radio frequency remote control unit 22 which emits radio waves 24. The internal control elements of turkey decoy 10 include a power switch 26, a power supply 28 (i.e., batteries 28), a RF receiver 30, and two separate servo-motors 32 and 34. Servo-motor 32 controls the up and down movement of head 12, while servo-motor 34 controls the twisting side to side motion. Switch 26 and receiver 30 are connected to one another via electrical lead 31, and are both fixedly attached to the interior wall of body 16, more specifically, to the interior underside of body 16. Batteries 28 are fixedly held in a casing 36 which is fixedly secured to a trap door 38 positioned on the underside of body 16. Batteries 28 include an electrical lead 39 connected to switch 26. Trap door 38 is moveable between open and closed positions to allow for easy removal and installation of batteries 28. Servo-motor 32 is securely held within body 16 by a support 40 fixedly attached to the interior top wall of body 16, while servo-motor 34 is mounted on a support fixedly attached to opposing interior walls of neck 14. Servo-motors 32 and 34 respectively include arms 42 and 44 movably connected to the driveshafts thereof, and linkages 46 and 48 respectively, fixedly connected to arms 42 and 44. Electrical leads 47 and 49 respectively extend between servo-motors 34 and 36 and receiver 30 for actuation of the motors in either direction in response to RF signals of different frequencies transmitted by unit 22 and received by unit 30. Linkages 46 and 48 are each connected to head 12, linkage 46 via a flexible string 50 and linkage 48 by being fixedly connected to sidewalls of head 12 as best seen in FIG. 5. Linkages 46 and 48 serve to translate the respective motion of arms 42 and 44 to head 12 and/or neck 14 of turkey decoy 10.

Remote control unit 22 includes a power switch 52, joysticks 54 and 56, and antenna 58. When both power switches 26 and 52 are switched to the "on" positions, the movement of turkey decoy 10 may be remotely controlled. Each signal generated by movement of joysticks 54 and 56, either up, down, left, or right, has a particular frequency. The frequency is interpreted by receiver 30 and appropriate actuating signals are provided to servo-motors 32 and 34, which produce the desired movement of head 12. The signal generated by remote control unit 22 when joystick 54 is moved either up or down is received by receiver 30 and supplied to servomotor 32 via electrical lead 47. Servo-motor 32 translates the particular electrical signal received into corresponding mechanical movement of its driveshaft, thus imparting movement to arm 42 and linkage 46, causing the up and down movement of head 12. When joystick 56 is moved to either its left or right, the signal generated by remote control unit 22 is received by receiver 30 and supplied to servo-motor 34 via electrical lead 49. Servo-motor 34 translates the particular electrical signal received into corresponding mechanical movement of its driveshaft, thus imparting movement to arm 44 and linkage 48, causing the twisting side to side movement of head 12.

Figure 7:
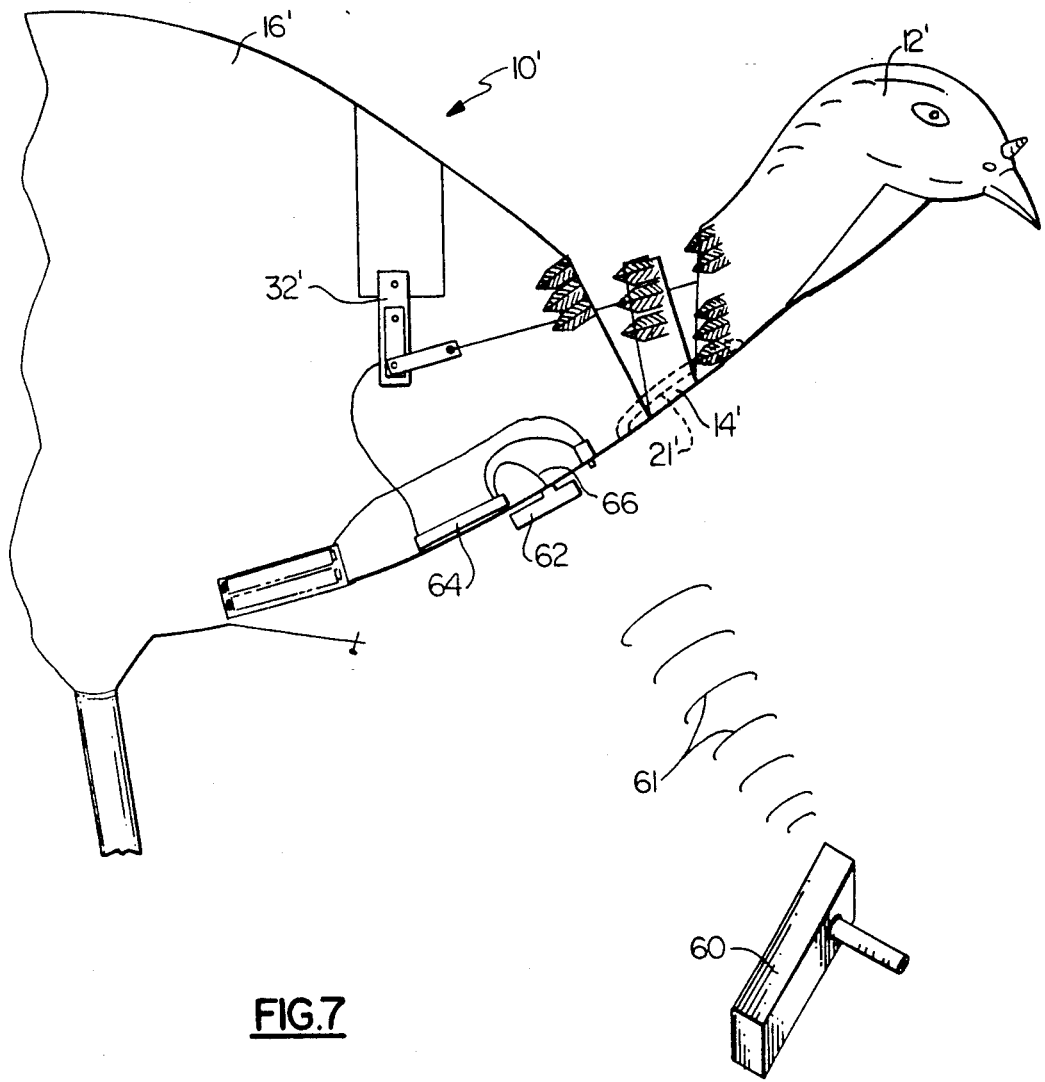
FIG. 7 is a fragmentary side elevational view of a second embodiment of a turkey decoy.

In the second embodiment of the present invention, as seen in FIG. 7, turkey decoy 10' is sensitive, and responsive, to sound waves 61. In this embodiment, turkey decoy 10' is capable only of the pivotal up and down movement of head 12' and neck 14' previously described, although movement is initiated only by sound waves.

Figure 8:
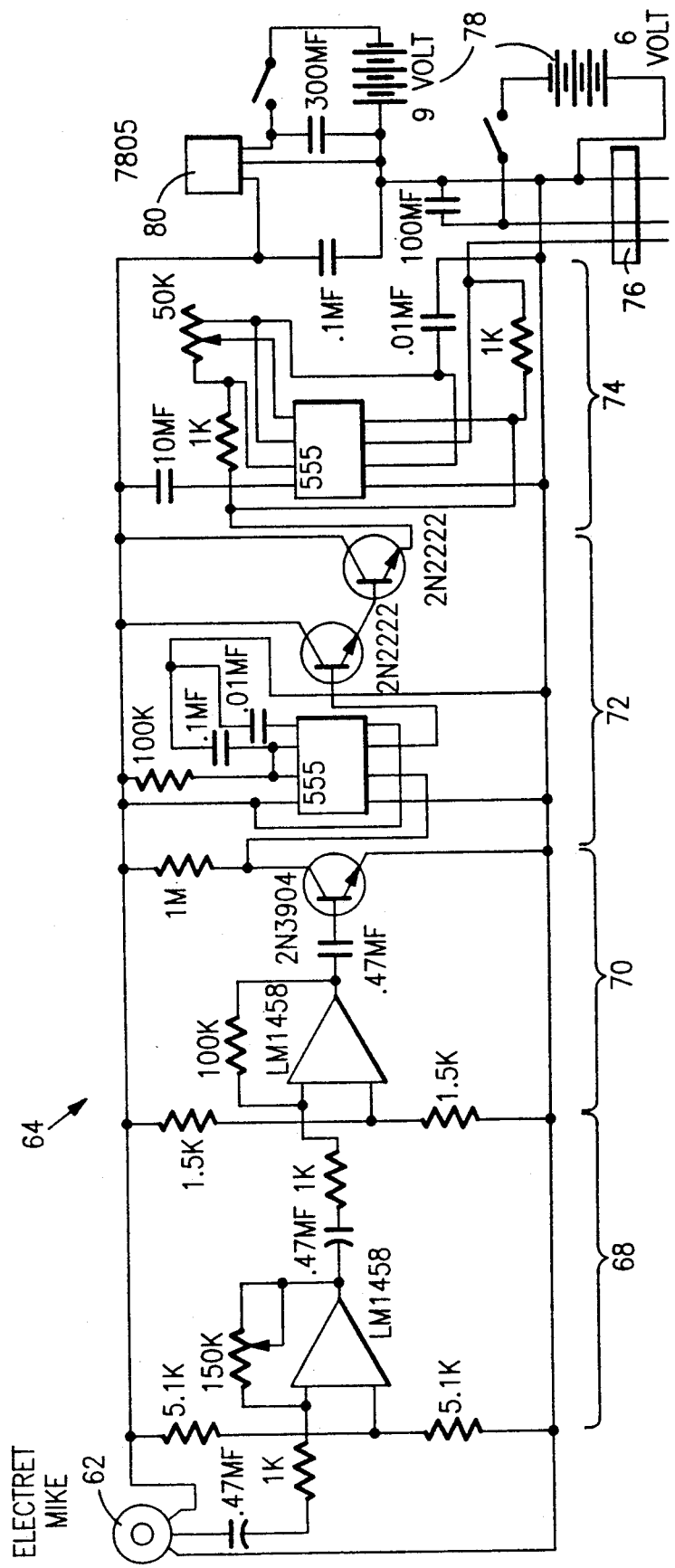
FIG. 8 is an electrical schematic showing the sound activated circuit utilized in the turkey decoy of FIG. 7.

Although any sound will initiate the movement of head 12', the sound of a turkey's gobble is preferred. This gobbling sound may come from a live turkey inn the vicinity of decoy 10', or may be simulated by a turkey call 60. The sound waves 61 generated by turkey call 60 are picked up by a microphone 62 positioned on the exterior underside of body 16'. Microphone 62 translates sound waves 61 into electrical impulses, which provides an input to a sound activated circuit 64, shown schematically in FIG. 8, via electrical lead 66.

Circuit 64 is comprised of several interconnected circuit elements. The electrical signal generated in response to audible sounds received by microphone 62 is directly connected to a high-gain amplifying circuit, denoted generally by reference numeral 68. The output of amplifying circuit 68 is connected to a timer circuit 70. Timer circuit 70 extends the pulsewidth of the signal received, thus increasing the duration of the signal supplied to servo-motor 32', and increasing the travel distance of head 12'. Timer circuit 70 continues the path of circuit 64 thence to transistorized switch 72 and oscillating circuit 74. The output of oscillating circuit 74 is connected to motor 34' through one pin of a three in plug 76, the other two pins of which are connected to DC power supplies 78, including voltage regulator 80.

What is claimed is:

1. An animated wildfowl decoy and movement control means comprising:
    a) hollow head, neck and body portions having an external appearance simulating a live wildfowl;
    b) first motor means actuable in response to first electrical signals;
    c) first motion transmission means connecting said first motor means to at least one of said head and neck portions to effect reciprocating, up and down movement of said head and neck portions with respect to said body portion in response to actuation of said first motor means;
    d) second motor means actuable in response to second electrical signals;
    e) second motion transmission means connecting said second motor means to said head portion to effect reciprocating, twisting movement of said head portion wi&.h respect to said neck portion in response to actuation of said second motor means; and
    f) means for selectively causing generation of said first and second electrical signals from a position remote from said decoy.

2. The invention according to claim 1 wherein said first motor means is mounted internally of said body portion.

3. The invention according to claim 2 wherein said second motor means is mounted internally of said neck portion.

4. The invention according to claim 1 wherein said neck portion comprises a plurality of interconnected, relatively moveable longitudinal sections.

5. The invention according to claim 1 wherein said first motion transmission means comprises a rigid link rotatable by said first motor means and a flexible cord connecting said link to one of said head and neck portions.

6. The invention according to claim 4 wherein each of said first and second motor means and said first and second motion transmission means are mounted entirely interiorly of said decoy.

7. The invention according to claim 1 wherein said second motor means is mounted internally of said neck portion and is connected to said head portion by said second motion transmission means.

8. The invention according to claim 6 wherein said head and neck portions meet substantially at a transverse plane, and said twisting movement comprises rotation of said head portion about an axis normal to said plane.

9. The invention according to claim 1 wherein said means for causing generation of said electrical signals comprises a hand-held RF transmitter, and further including an RF receiver mounted internally of said decoy for controlling generation of said first and second electrical signals in response to signals received from said transmitter.

10. A sound-actuated, movable wildfowl decoy comprising:
   a) hollow head, neck and body portions, having an external appearance simulating a live wildfowl;
   b) motor means actuable in response to a predetermined electrical signal;
   c) motion transmission means connecting said motor means to at least one of said head and neck portions to impart reciprocating movement thereto with respect to said body portion in response to actuation of said motor means;
   d) sound pick-up means mounted upon said decoy for generating an electrical output in response to audible sounds; and
   e) means for generating said predetermined signal in response to said output.

11. The invention according to claim 10 wherein said motion transmission means imparts up and down movement to said head and neck portions in response to actuation of said motor means.

12. The invention according to claim 10 wherein each of said motor means, motion transmission means and pick-up means are mounted internally of said decoy.

13. The invention according to claim 12 wherein said pick-up means comprises a microphone.

14. The invention according to claim 13 wherein said means for generating said predetermined signal comprise a high gain amplifying circuit and an oscillating circuit.

15. The invention according to claim 10 wherein said predetermined signal has a finite pulse width and the distance of travel of said reciprocating movement is commensurate with said pulse width.

16. The invention according to claim 15 wherein said means for generating said electrical signal comprise means for controlling said pulse width.

17. The invention according to claim 16 wherein said means for generating said electrical signal further comprise a high gain amplifying circuit connected between an output of said pick-up means and an input of said means for controlling said pulse width.

18. The invention according to claim 17 wherein said means for generating said electrical signal further comprise an oscillating circuit connected to said motor means.

19. The invention according to claim 18 and further comprising an on-off switch mounted upon said decoy and selectively operable to render said motor means operable and inoperable.

* * * * *